(12) United States Patent
Norita et al.

(10) Patent No.: US 6,204,916 B1
(45) Date of Patent: Mar. 20, 2001

(54) THREE DIMENSIONAL INFORMATION MEASUREMENT METHOD AND APPARATUS

(75) Inventors: Toshio Norita, Osaka; Fumiya Yagi, Toyonaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/243,809

(22) Filed: Feb. 3, 1999

Related U.S. Application Data
(60) Provisional application No. 60/100,883, filed on Sep. 23, 1998.

(30) Foreign Application Priority Data

Feb. 3, 1998 (JP) .................................................. 10-021992

(51) Int. Cl.$^7$ .............................. G01B 11/26; G01C 1/00; G01C 21/02
(52) U.S. Cl. .................................... 356/141.1; 356/141.5; 356/141.4; 250/206.2
(58) Field of Search .................... 356/4.01, 141.1–141.5, 356/139.01–139.08; 702/150–153; 250/206.2

(56) References Cited

U.S. PATENT DOCUMENTS

| | | | |
|---|---|---|---|
| 3,897,151 | * | 7/1975 | Lecroy . |
| 4,457,621 | * | 7/1984 | Harris et al. . |
| 4,791,297 | * | 12/1988 | Savoca et al. .................... 250/347 |
| 5,110,202 | * | 5/1992 | Dornbusch et al. . |
| 5,114,226 | * | 5/1992 | Goodwin et al. . |
| 5,146,287 | * | 9/1992 | Carder . |
| 5,455,670 | * | 10/1995 | Payne et al. ....................... 356/5.1 |
| 5,461,473 | * | 10/1995 | Pratt et al. ........................ 356/141.3 |
| 5,668,631 | | 9/1997 | Norita et al. . |
| 5,808,727 | * | 9/1998 | Katayama ......................... 356/4.01 |

FOREIGN PATENT DOCUMENTS

| | | |
|---|---|---|
| 3-138508 | 6/1991 | (JP) . |
| 5-223547 | 8/1993 | (JP) . |
| 5-322526 | 12/1993 | (JP) . |
| 7-174536 | 7/1995 | (JP) . |
| 7-191142 | 7/1995 | (JP) . |
| 7-299921 | 11/1995 | (JP) . |
| 8-308106 | 11/1996 | (JP) . |

* cited by examiner

Primary Examiner—Stephen C. Buczinski
(74) Attorney, Agent, or Firm—Burns, Doane, Swecker & Mathis, LLP

(57) ABSTRACT

A three dimensional information measurement apparatus employing a rotator or surface-of-rotation type mirror, an imaging apparatus disposed with its light receiving axis aligned with a center axis of said rotator type mirror for measuring three dimensional information on a target placed in a space surrounding said center axis, and a reference light projection means for projecting reference light. Also, main scanning is performing by deflecting the reference light in a circumferential direction centered about the center axis or, in an alternative embodiment, avoided by providing a conically shaped reference beam. Sub scanning is performed by deflecting said reference light in a direction of projection whereby said reference light changes in a direction parallel to said center axis either by changing the angle of the main scanning mirror; and three dimensional information computing means for obtaining the three dimensional information of said target, based on a physical quantity corresponding to a projection angle representing the direction of projection of said reference light in the sub scan, and on a physical quantity corresponding to the position of a projected image obtained by said imaging apparatus and representing said reference light reflected from said target via said rotator type mirror.

27 Claims, 15 Drawing Sheets

THREE DIMENSIONAL INFORMATION MEASUREMENT METHOD AND APPARATUS

Priority is claimed to Japanese Application No. 10-021992 filed on Feb. 3, 1998 and to U.S. Provisional Application No. 60/100,883, filed Sep. 23, 1998, both of which are herein incorporated by reference.

BACKGROUND OF THE INVENTION

1. Technical Field of the Invention

The present invention relates to a three dimensional information measurement method and apparatus for measuring three dimensional information on an object over a wide angular range, and for inputting the measured information, and more particularly to a three dimensional information measurement method and apparatus capable of making measurements over an angular range, for example, of 180 or 270 degrees, or from all directions through 360 degrees.

2. Description of Related Art

Recent years have seen rapid advances in virtual reality and mobile robot technologies. In these fields, it is required to input three dimensional information of objects that are to be captured for imaging or detection, and with this requirement, interest in and demand for three dimensional information measurement apparatuses have been increasing.

In the case of a mobile robot, when the robot moves, it is necessary to constantly monitor the surroundings for obstructions in order to avoid collisions, and to steer away from any obstructions. Whether an object located in the surrounding space is an obstruction or not is judged by measuring the distance to the object by a three dimensional information measurement apparatus mounted on the mobile robot, and by checking if the distance has decreased below a predetermined value. Such judgement must be made in real time, requiring that the distance in each direction be measured at high speed around the entire circumference.

In a known technique for measuring the distances to surrounding objects over a wide angular range, it has been practiced to rotate the camera part of the distance measurement apparatus while shooting the surroundings. If the rotational speed is slow, the time difference between the timing of the camera's line of sight capturing an object in one direction and the timing of capturing an object in the next direction increases, resulting in slow monitoring. If the rotational speed is increased, the camera's line of sight quickly scans the surroundings, so that the time difference is reduced and quick monitoring can be achieved. This, however, increases the size of the mechanism provided for that purpose, and also, rotational noise becomes a problem.

There has been proposed an omnidirectional distance detection apparatus in which, instead of rotating the camera part, two mirrors for projecting and receiving reference light for distance measuring are assembled in one unit and are rotated together (Japanese Patent Unexamined Publication No. 7-191142). However, in the omnidirectional distance detection apparatus disclosed in the above patent publication, the mirrors are housed in a cylindrically shaped casing having a transparent circumferential wall and are rotated about the axis of the casing to irradiate surrounding objects with reference light and to receive its reflected light for distance measuring. The mirrors are driven by a motor via a rotor, and the rotor, motor, etc. are all housed in the casing, providing the effect of reducing the rotational noise. The construction is complex compared with the method of rotating the camera's line of sight. Since the two mirrors for projecting and receiving the reference light are rotated together, the apparatus size increases, and the stability of the apparatus decreases when the rotational speed is increased.

OBJECTS AND SUMMARY OF THE INVENTION

The present invention has been devised in view of the above problems, and it is an object of the invention to provide a three dimensional information measurement method and apparatus capable of measuring three dimensional information of objects located in a space extending a wide angular range, at high speed and with high stability using a relatively simple configuration.

According to the invention, there is provided a three dimensional information measurement method for measuring three dimensional information on a target placed in a space surrounding a center axis of a rotator type mirror by using the rotator type mirror in combination with an imaging apparatus disposed with its light receiving axis aligned with the center axis of the rotator type mirror, comprising: scanning the target by projecting reference light from a position on the center axis; and obtaining the three dimensional information of the target, based on a physical quantity corresponding to the projection angle of the reference light and on a physical quantity corresponding to the position of a projected image obtained when the reference light reflected from the target is captured by the imaging apparatus via the rotator type mirror.

According to this invention, since driving in the main scan direction is rendered unnecessary, higher speed and higher stability can be achieved.

According to another aspect of the invention, there is provided a three dimensional information measurement apparatus, having a rotator type mirror and an imaging apparatus disposed with its light receiving axis aligned with a center axis of the rotator type mirror, for measuring three dimensional information on a target placed in a space surrounding the center axis, comprising: reference light projection means for projecting reference light in the form of a beam; main scanning means for performing a main scan by deflecting the reference light in such a manner that the direction of projection of the reference light changes in a circumferential direction centered about the center axis; sub scanning means for performing a sub scan by deflecting the reference light in such a manner that the direction of projection of the reference light changes in a direction parallel to the center axis; and three dimensional information computing means for obtaining the three dimensional information of the target, based on a physical quantity corresponding to a projection angle representing the direction of projection of the reference light in the sub scan, and on a physical quantity corresponding to the position of a projected image obtained by the imaging apparatus and representing the reference light reflected from the target.

According to still another aspect of the invention, there is provided a three dimensional information measurement apparatus, having a rotator type mirror and an imaging apparatus disposed with its light receiving axis aligned with a center axis of the rotator type mirror, for measuring three dimensional information on a target placed in a space surrounding the center axis, comprising: radiating reference light projection means, provided on the center axis, for projecting radiating reference light spreading in the form of a conical surface; sub scanning means for performing a sub scan by deflecting the reference light in such a manner as to change the projection angle of the reference light; and three dimensional information computing means for obtaining the three dimensional information of the target, based on a physical quantity corresponding to the projection angle representing the direction of projection of the reference light in the sub scan, and on a physical quantity corresponding to the position of a projected image obtained by the imaging apparatus and representing the reference light reflected from the target.

For the physical quantity corresponding to the projection angle, the projection angle itself or the physical quantity associated with the projection angle is used, such as the elapsed time from the start of the sub scan or the amount of movement of the light source, mirror, slit, or the like. For the physical quantity corresponding to the position of the projected image, the distance of the position of the projected image from a reference position, or the direction opposing the pixel on which the projected image is projected, is used.

In this specification, the term "on the center axis" in the phrase "projecting reference light from a position on the center axis" includes points on the center axis and its surroundings.

BRIEF DESCRIPTION OF THE DRAWINGS

The present invention will now be described by way of exemplary embodiments to which it is not limited with reference to the accompanying drawings in which.

DETAILED DESCRIPTION OF PREFERRED EMBODIMENTS

First Embodiment

Figure 1:
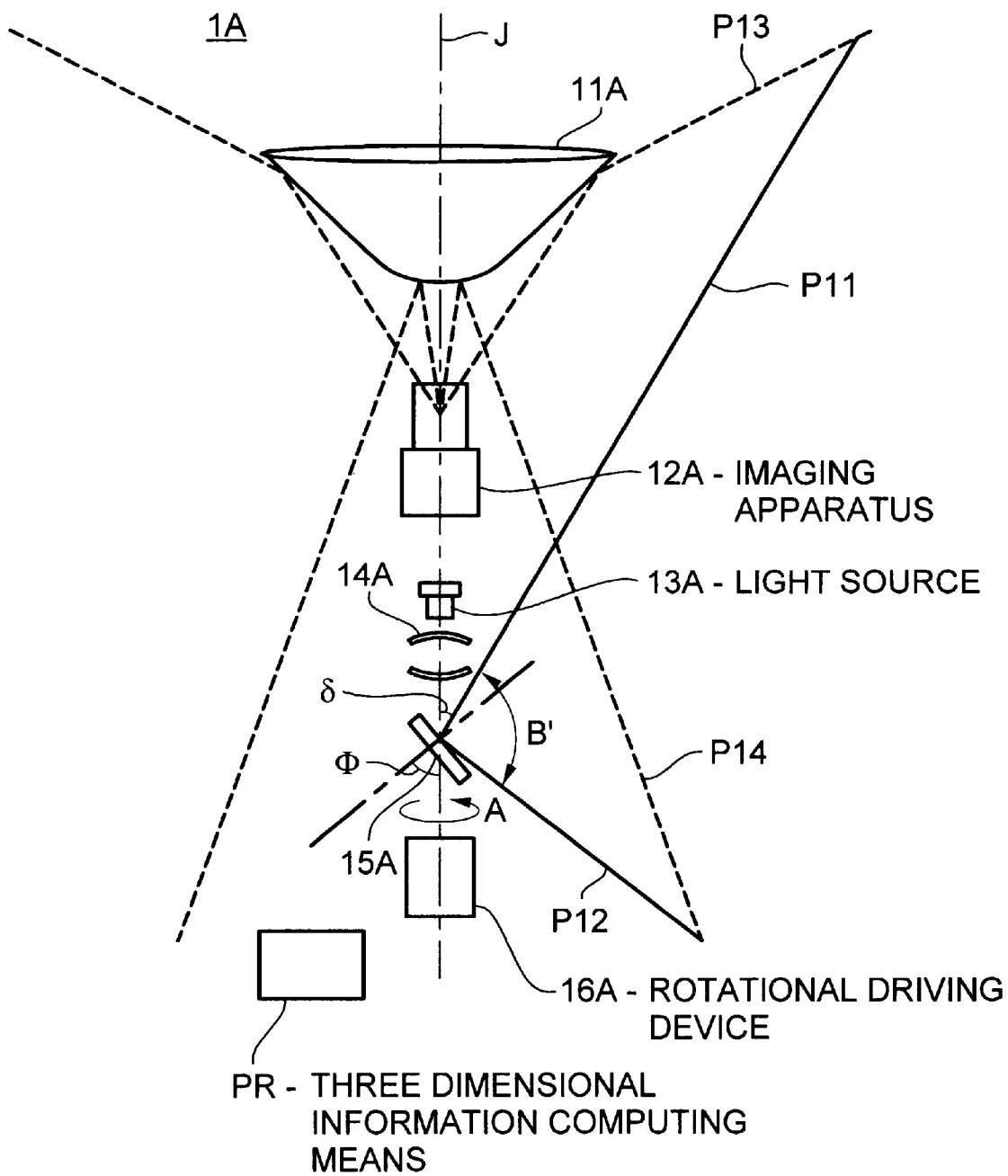
FIG. 1 is a diagram showing the configuration of a three dimensional information measurement apparatus according to a first embodiment.

FIG. 1 is a diagram showing the configuration of a three dimensional information measurement apparatus 1A according to a first embodiment.

In FIG. 1, the three dimensional information measurement apparatus 1A comprises an imaging mirror 11A, an imaging apparatus 12A, a light source 13A, a scanning optical system 14A, a scanning mirror 15A, and a rotational driving device 16A.

The imaging mirror 11A is a rotator type mirror (a rotated-surface type mirror) having a quadric surface as a surface-of-revolution that is obtained by rotating a line or a quadric curve, such as a hyperbola, an ellipse, or a parabola, about a center axis J serving as the generatrix. That is, the imaging mirror 11A is symmetrical about the axis J, and its cross section cut by a plane containing the axis J is a curve such that the slope of its tangent, relative to the horizontal axis, monotonically increases. The imaging mirror 11A is disposed with the axis J arranged along the vertical direction and with its reflecting surface facing down. References to "up" and "down" are only for convenience and are not intended to be limitations.

Below the imaging mirror 11A is arranged the imaging apparatus 12A in such a manner that its light receiving axis coincides with the axis J. The imaging apparatus 12A includes an optical lens and an imaging device. A video camera, for example, is used as the imaging apparatus 12A. Since light reflected by the imaging mirror 11A enters the imaging apparatus 12A, images from all directions can be captured by the imaging apparatus 12A. Accordingly, images of objects located in all directions around the axis J, except those occluded by the constituent members of the three dimensional information measurement apparatus 1A including the imaging apparatus 12A itself, are simultaneously taken into a single image when captured by the imaging device in the imaging apparatus 12A.

Disposed below the imaging apparatus 12A are the light source 13A, the scanning optical system 14A, the scanning mirror 15A, and the rotational driving device 16A, arranged along the axis J in this order from top to bottom.

The light source 13A emits reference light which is passed through the scanning optical system 14A to form a reference light beam having a suitable diameter. This reference light beam is reflected by the scanning mirror 15A and radiated into the surrounding space.

The scanning mirror 15A is angularly controllable about an axis perpendicular to the axis J. That is, deflection angle φ, i.e., the angle that the axis perpendicular to the reflecting surface of the scanning mirror 15A makes with the axis J, is variably controlled. Accordingly, the reference light beam reflected by the scanning mirror 15A is directed, for example, in the direction of solid line P11 when the deflection angle φ is minimum, and in the direction of solid line P12 when the deflection angle φ is maximum. That is, the reference light beam is radiated over the angular range indicated by arrow B' between the solid lines P11 and P12. If an object is located within this angular range, the object is scanned by the reference light beam, in the direction parallel to the axis J. Reflected light from the object enters the imaging apparatus 12A after traveling along the paths indicated by dashed lines P13, P14, etc.

In this specification, the scan in the direction parallel to the axis J is called the sub scan. A mechanism for controlling the deflection angle φ is provided for the scanning mirror 15A to perform the sub scan. However, if a device incorporating an angular control mechanism, for example, a galvanometer scanner or the like, is used as the scanning mirror 15A, the sub scanning device can be implemented in simple construction without having to provide a separate mechanism for controlling the deflection angle φ.

The rotational driving device 16A is constructed with a motor or with a motor, gear, etc., and drives the scanning mirror 15A, or the scanning mirror 15A and either the light source 13A or the scanning optical system 14A or both, to rotate about the axis J as shown by arrow A. With this arrangement, the reference light beam reflected by the scanning mirror 15A is deflected to scan along the circumferential direction around the axis J, and is thus radiated in all directions around the axis J. As a result, any object located in any direction around the axis J is scanned by the reference light beam. In this specification, the circumferential scan about the axis J is called the main scan.

The three dimensional information measurement apparatus 1A scans all directions within the angular range indicated by arrow B' by combining the main scan and the sub scan, and measures objects located within that range.

That is, for one cycle of the main scan (one revolution along the direction of arrow A), the angle of the scanning mirror 15A is changed by an amount equal to the resolution of the sub scan direction, the angle thus being changed incrementally while the sub scan once traverses the range indicate by arrow B'. In this way, the reference light beam is radiated to scan objects located in all directions around the axis J within the range indicated by arrow B'.

Next, the principle on how the three dimensional information measurement apparatus 1A measures three dimensional information on objects will be described with reference to FIGS. 2, 3, etc.

Figure 2:
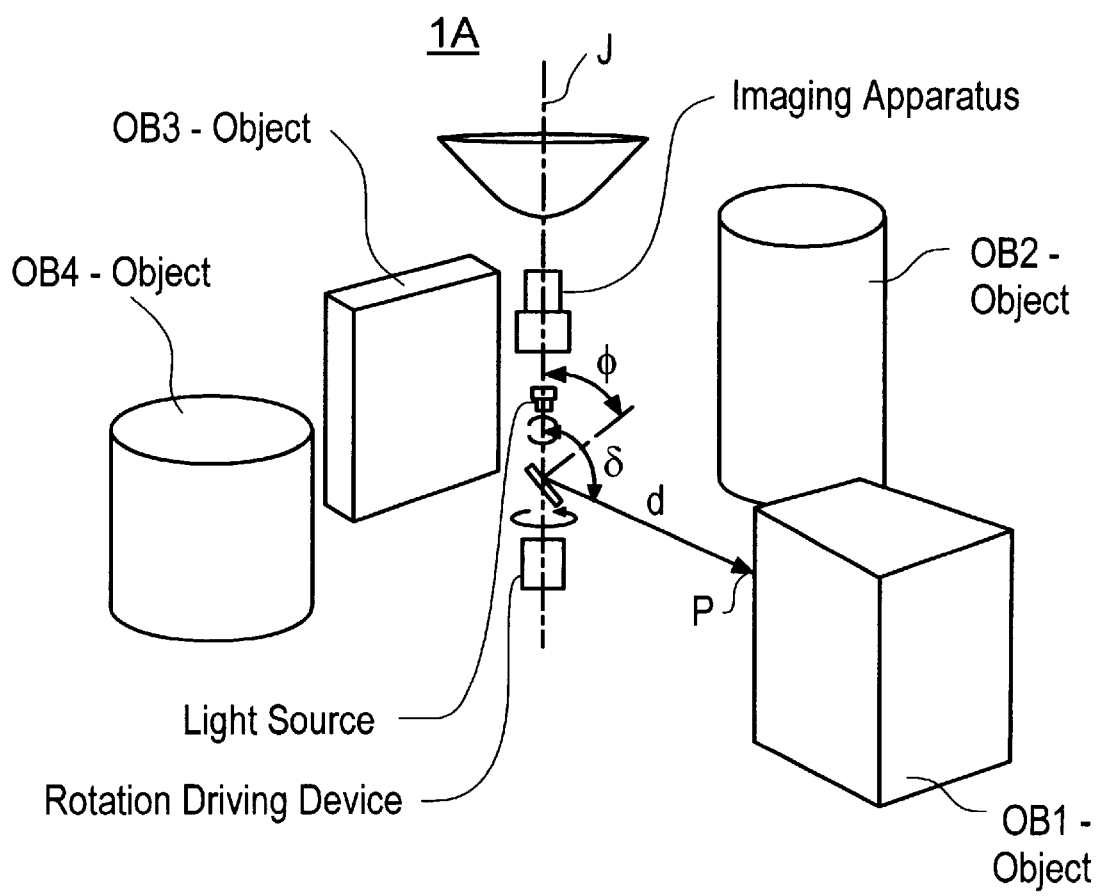
FIG. 2 is a diagram showing the three dimensional information measurement apparatus installed in an environment where objects of three dimensional shapes are arranged.

FIG. 2 is a diagram showing the three dimensional information measurement apparatus 1A installed in an environment where objects OB1 to OB4 of three dimensional shapes are arranged.

Figure 3:
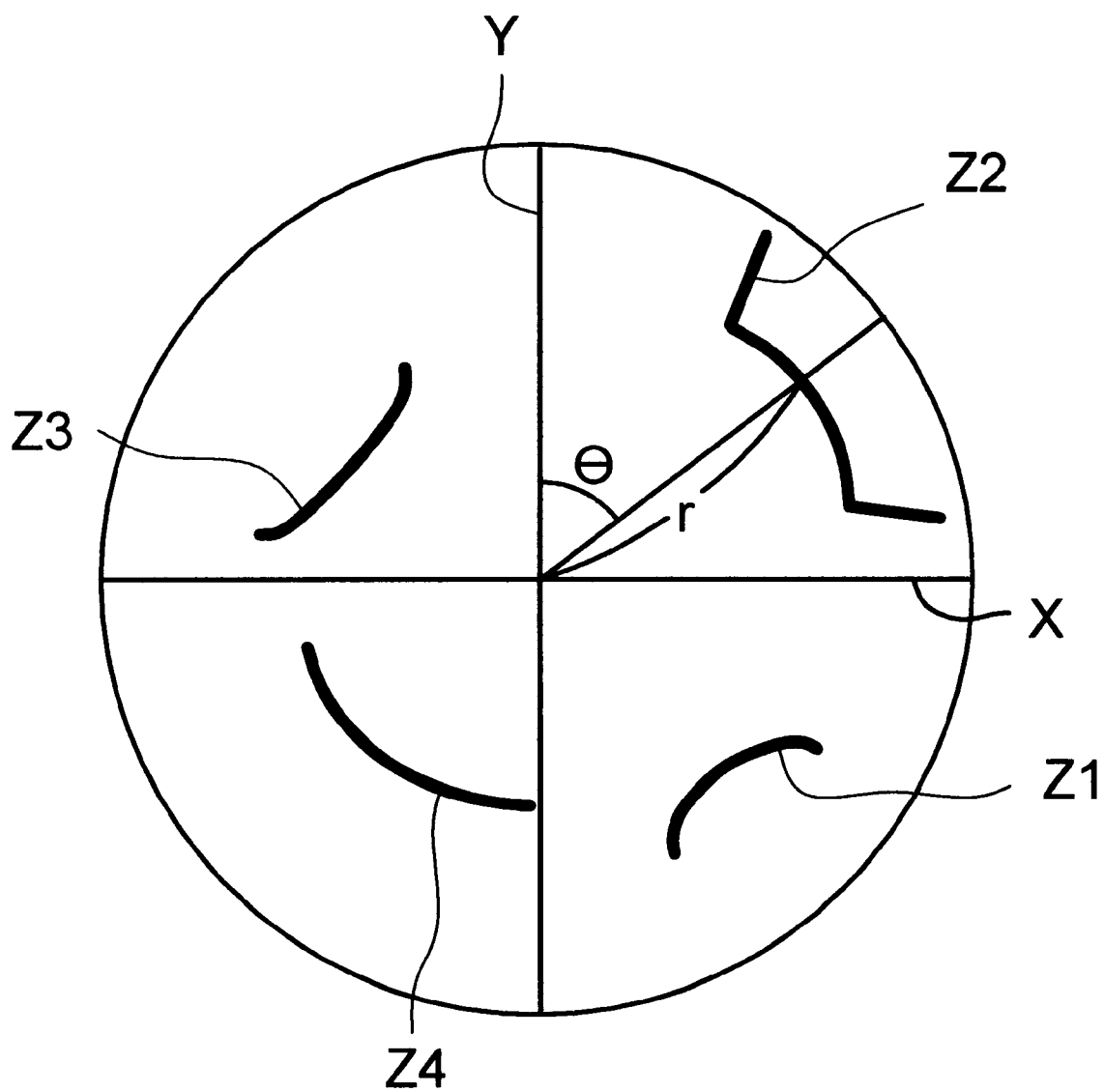
FIG. 3 is a diagram showing the loci of reference light spots observed by an imaging apparatus.

FIG. 3 is a diagram showing the loci, Z1 to Z4, of reference light spots captured by the imaging apparatus 12A during one cycle of the main scan at a given sub scan timing when the three dimensional information measurement apparatus 1A is operated in the condition shown in FIG. 2.

In FIG. 3, the azimuth angle of each reference light spot is expressed by angle θ measured clockwise from the reference vertical axis Y, and the observed position of the reference light spot is expressed by distance r from the image center O.

In this case, if the projection originating position of the reference light beam is known, the observed position, r, of the reference light spot at the angular position of the azimuth angle θ is uniquely determined by the projection angle δ of the reference light beam and the distance d (see FIG. 2) between the projection originating position of the reference light beam and the point P at which the reference light beam hits the object OB. The projection angle δ uniquely determined by the deflection angle φ of the scanning mirror 15A. In other words, the distance d to the object OB is obtained from the deflection angle φ of the scanning mirror 15A and the observed position r.

Accordingly, the distance d can be computed based on the principle of triangulation from the equation defining the shape of the imaging mirror 11A and the positional relationship of the imaging apparatus 12A, scanning optical system 14A, etc. By repeating such processing or operation for all azimuth angles from 0 through 360 degrees, the distance d to any object OB located within the angular range in all directions around the axis J can be computed with respect to a given deflection angle φ of the scanning mirror 15A. Further, by changing the deflection angle φ within the sub scan range, three dimensional information can be computed on any object OB located in any direction around the axis J.

In a three dimensional information computing section PR, the computation of the distance d for all directions, i.e., the computation of the three dimensional information of the object OB, is performed based on the output of the imaging device in the imaging apparatus 12A, control amounts or coefficients for the main scan and sub scan, predetermined constants, etc. The computation method and processing circuit will be described later.

Second Embodiment

Figure 4:
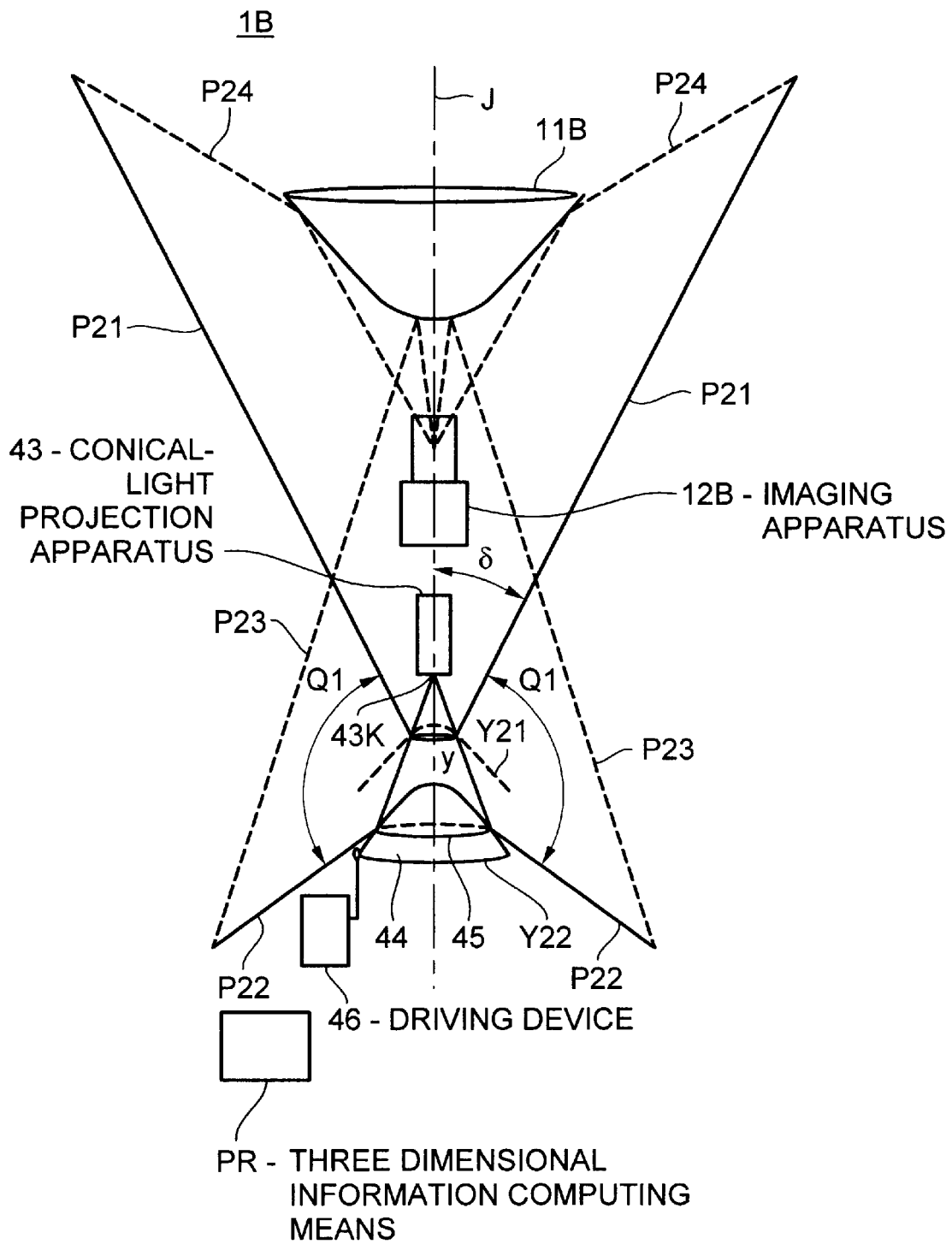
FIG. 4 is a diagram showing the configuration of a three dimensional information measurement apparatus according to a second embodiment.

FIG. 4 is a diagram showing the configuration of a three dimensional information measurement apparatus 1B according to a second embodiment.

In the three dimensional information measurement apparatus 1B also, an imaging mirror 11B, similar in shape to the one used in the three dimensional information measurement apparatus 1A of the first embodiment, is provided. Below the imaging mirror 11B is disposed an imaging apparatus 12B whose light receiving axis is aligned with the axis J.

Downward of the imaging apparatus 12B and along the axis J are arranged a conical-light projection apparatus 43 and a scanning mirror 44. The conical-light projection apparatus 43 projects reference light 45 of a conical surface shape downward through a projection opening 43K. That is, the cross section of the reference light 45, cut by a plane perpendicular to its direction of travel, is annular in shape, the diameter increasing with increasing distance in the direction of travel. The scanning mirror 44 is similar in shape to the imaging mirror 11B, and is placed with its reflecting surface facing up. The reference light 45 striking the reflecting surface of the scanning mirror 44 is annular in shape. The scanning mirror 44 is moved up and down along the axis J in rectilinearly reciprocating fashion by a driving device 46. As the scanning mirror 44 moves, the distance between the conical-light projection apparatus 43 and the scanning mirror 44 changes. As a result, the position at which the reference light 45 strikes the scanning mirror 44 changes, thus changing the projection angle δ of its reflected light.

When the scanning mirror 44 is located at the position shown by dashed line Y21, the incident reference light 45 is reflected at the position on the scanning mirror 44 where its slope is small, and the reflected light is radiated in the form of radiating reference light P21 into the surrounding space. When the scanning mirror 44 is located at the position shown by dashed line Y22, the incident reference light 45 is reflected at the position on the scanning mirror 44 where its slope is large, and the reflected light is radiated in the form of radiating reference light P22 into the surrounding space. Reflected light from objects illuminated with the radiating reference light P21, P22 is introduced into the imaging apparatus 12B via the paths indicated by dashed lines P23, P24, etc. In this way, the reference light P21, P22 is simultaneously radiated in all directions of the main scan, that is, over the full range of the azimuth angle θ from 0 to 360 degrees, and the sub scan is performed by moving the scanning mirror 44.

Accordingly, in the three dimensional information measurement apparatus 1B of the second embodiment, the rotational driving device 16A used in the first embodiment for performing the main scan need not be provided. Furthermore, since the reference light P21, P22 is simultaneously radiated in all directions, no time difference occurs in scanning the circumferential direction, unlike the case of the first embodiment.

In the three dimensional information measurement apparatus 1B, the three dimensional information of the object OB is measured based on the same principle as that used in the three dimensional information measurement apparatus 1A of the first embodiment.

That is, let y denote the position of the scanning mirror 44 when the scanning mirror 44 is reflecting the reference light 45 and projecting the radiating reference light at the projection angle δ. In this case, the observed position of the reference light on the imaging apparatus 12B is uniquely determined by the projection angle δ and the distance d (see FIG. 2) between the projection originating position of the reference light beam and the point P at which the reference light beam hits the object OB, as in the case of FIGS. 2 and 3. Accordingly, the distance d to the object OB is obtained from the position, y, of the scanning mirror 44 and the observed position r.

Further, instead of moving the scanning mirror 44, the conical-light projection apparatus 43 may be moved.

Third Embodiment

Figure 5:
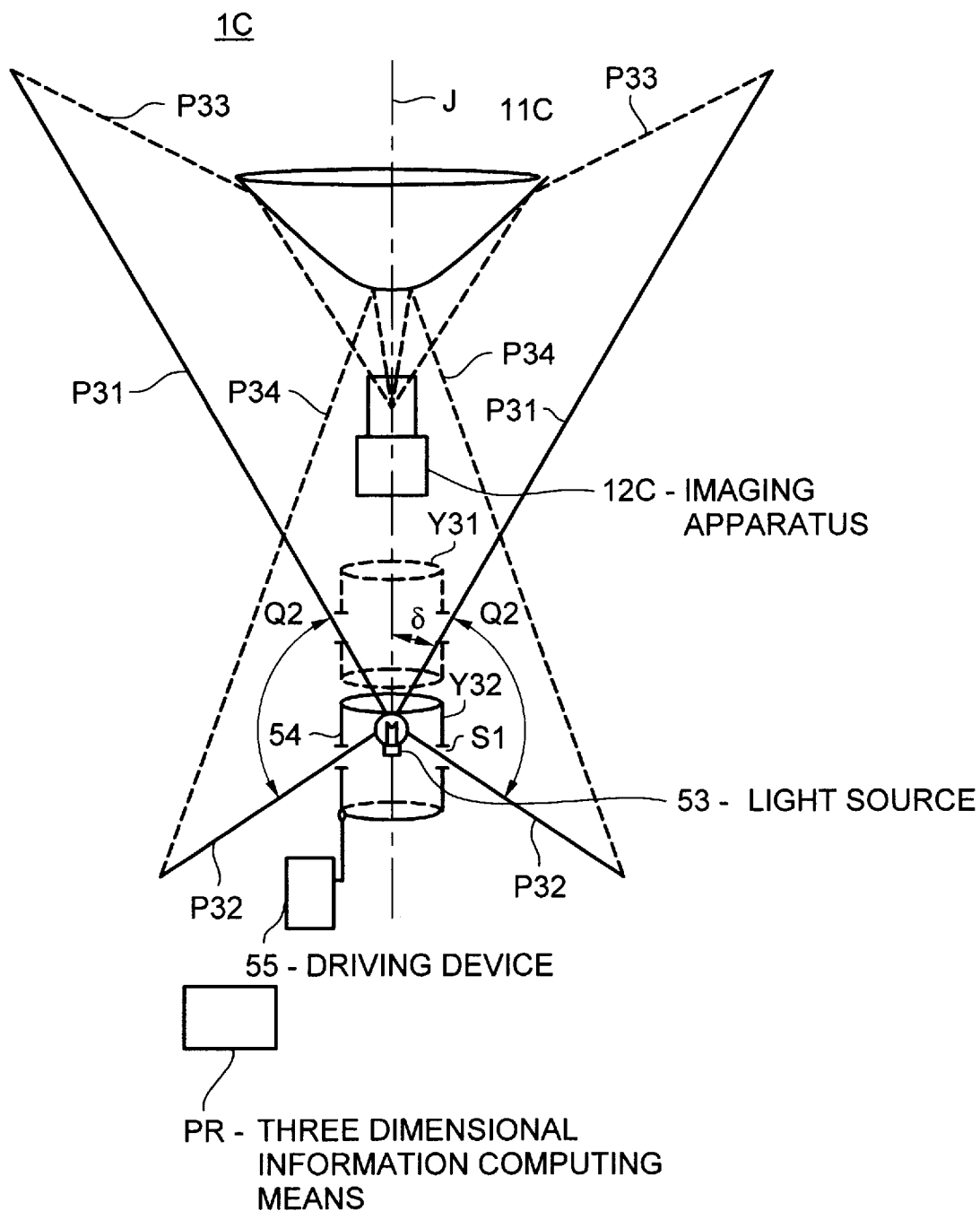
FIG. 5 is a diagram showing the configuration of a three dimensional information measurement apparatus according to a third embodiment.
Figure 6:
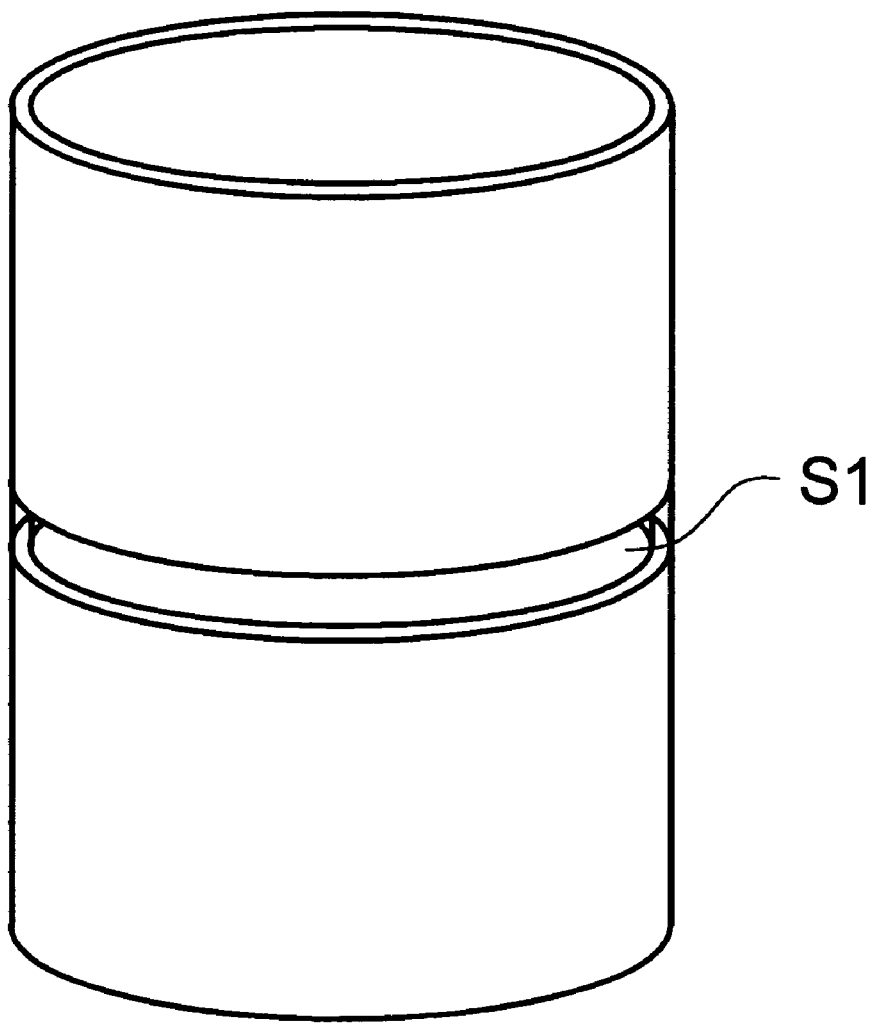
FIG. 6 is a diagram showing an external view of a mask used in the third embodiment.

FIG. 5 is a diagram showing the configuration of a three dimensional information measurement apparatus 1C according to a third embodiment, and FIG. 6 is a diagram showing an external view of a mask 54 used in the three dimensional information measurement apparatus 1C.

As shown in FIG. 5, in the three dimensional information measurement apparatus 1C also, an imaging mirror 11C, similar in shape to the one used in the three dimensional information measurement apparatus 1A of the first embodiment, is provided, and below the imaging mirror 11C is disposed an imaging apparatus 12C whose light receiving axis is aligned with the axis J. Below the imaging apparatus 12C is arranged a light source 53 on the axis J. Further, a cylindrically shaped mask 54 is provided on the axis J in such a manner as to cover the light source 53. The mask 54 is moved up and down along the axis J in rectilinearly reciprocating fashion by a driving device 55.

As clearly shown in FIG. 6, a slit S1 is provided around the entire circumference of the outer circumferential surface of the mask 54. The slit S1 is formed by forming a portion of the mask 54 with a transparent material. Alternatively, the mask 54 having the slit S1 may be constructed by dividing a cylindrically shaped member into two parts between top and bottom and by joining them together using a structural member with a gap provided between the two parts.

Light emitted from the light source 53 leaks through the slit S1 and is radiated outside. More specifically, as shown in FIG. 5, when the mask 54 is located at the position indicated by dashed line Y31, the light emitted from the light source 53 is radiated into the surroundings in the form of reference light P31 annular in cross section. When the mask 54 is located at the position indicated by solid line Y32, the emitted light is radiated into the surroundings in the form of reference light P32 which is also annular in cross section. In this way, by moving the mask 54, the reference light is radiated over the range indicated by arrow Q2 in FIG. 5. Therefore, by moving the mask 54, objects located in the surrounding space in any direction around the axis J can be scanned by the reference light. Reflected light from objects is introduced into the imaging apparatus 12C via the paths indicated by dashed lines P33, P34, etc.

Further, instead of moving the mask 54, the light source 53 may be moved.

Fourth Embodiment

Figure 7:
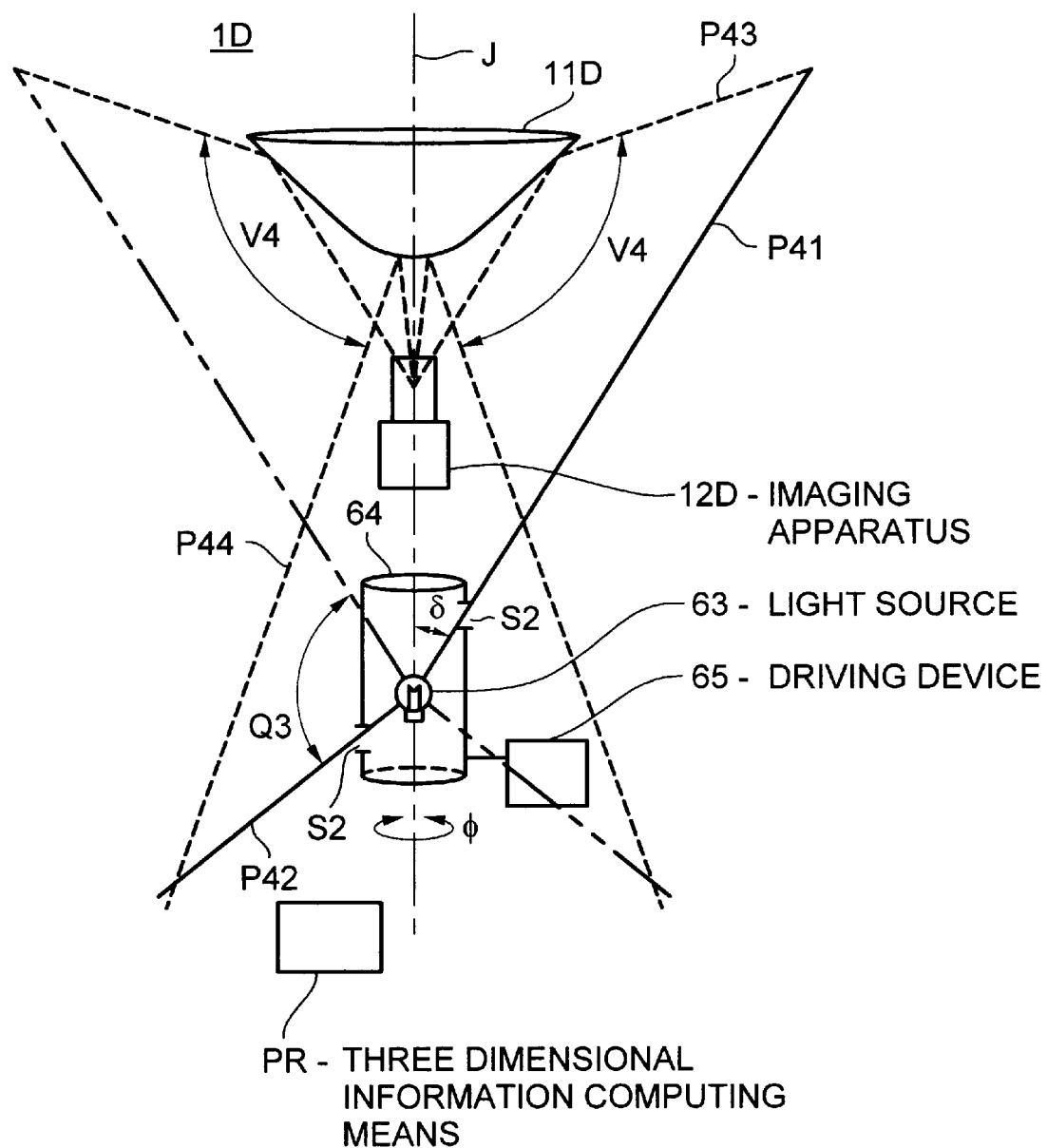
FIG. 7 is a diagram showing the configuration of a three dimensional information measurement apparatus according to a fourth embodiment.
Figure 8:
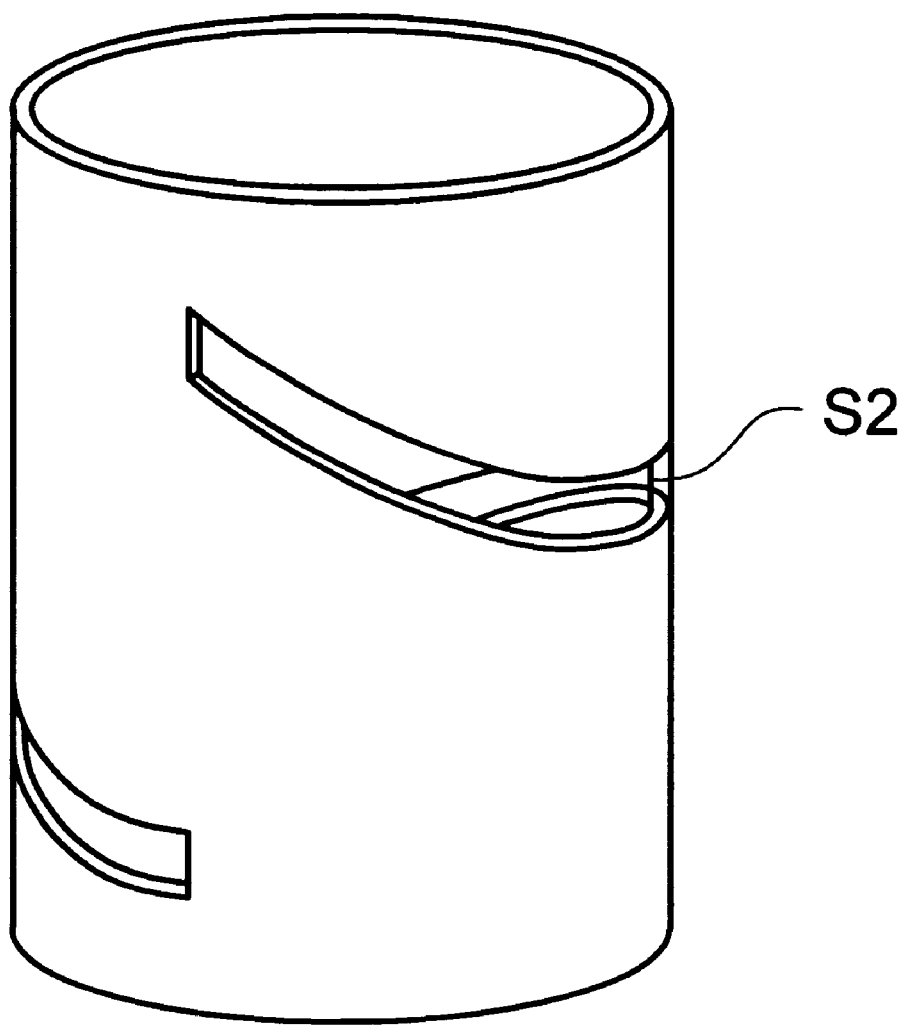
FIG. 8 is a diagram showing an external view of a mask used in the fourth embodiment.

FIG. 7 is a diagram showing the configuration of a three dimensional information measurement apparatus 1D according to a fourth embodiment, and FIG. 8 is a diagram showing an external view of a mask 64 used in the three dimensional information measurement apparatus 1D.

As shown in FIG. 7, in the three dimensional information measurement apparatus 1D also, an imaging mirror 11D, similar in shape to the one used in the first embodiment, is provided, and below the imaging mirror 11D is disposed an imaging apparatus 12D whose light receiving axis is aligned with the axis J. Below the imaging apparatus 12D is arranged a light source 63 on the axis J. Further, a cylindrically shaped mask 64 is provided on the axis J in such a manner as to cover the light source 63. The mask 64 is driven for rotation about the axis J by a driving device 65.

As clearly shown in FIG. 8, a helical slit S2 making one full turn around the circumference is formed in the outer circumferential surface of the mask 64. The slit S2 is formed by forming a portion of the mask 64 with a transparent material.

Light emitted from the light source 63 leaks through the slit S2 and is radiated outside as reference light. Since the slit S2 is helical in shape, the reference light passed through the slit S2 is radiated in spiraling fashion. That is, as shown in FIG. 7, at a certain angular position along the circumferential direction, the light emitted from the light source 63 is radiated as reference light P41 directed upward, and at another angular position along the circumferential direction, it is radiated as reference light P42 directed downward. In this way, the projection angle δ of the reference light radiated outside differs according to the angular position along the circumferential direction, the reference light as a whole continuously varying its direction in spiraling fashion between the maximum and minimum of the projection angle δ. Such spiraling reference light is itself rotated with the rotation of the mask 64, and is radiated in all directions over the range indicate by arrow Q3 and around the entire circumference while the mask 64 makes one revolution.

Therefore, by rotating the mask 64, objects located in the surrounding space in any direction around the axis J can be scanned by the reference light. Reflected light from objects is introduced into the imaging apparatus 12D via the paths indicated by dashed lines P43, P44, etc.

In the three dimensional information measurement apparatus 1D, the distance d can be computed based on the principle of triangulation from the equations defining the shapes of the imaging mirror 11D and the slit S2, the positional relationship of the imaging mirror 11D, imaging apparatus 12D, light source 63, mask 64, etc., and the rotation angle ψ of the mask 64. That is, the distance d is computed from the rotation angle ψ and the observed position r (see FIG. 2).

Fifth Embodiment

Figure 9:
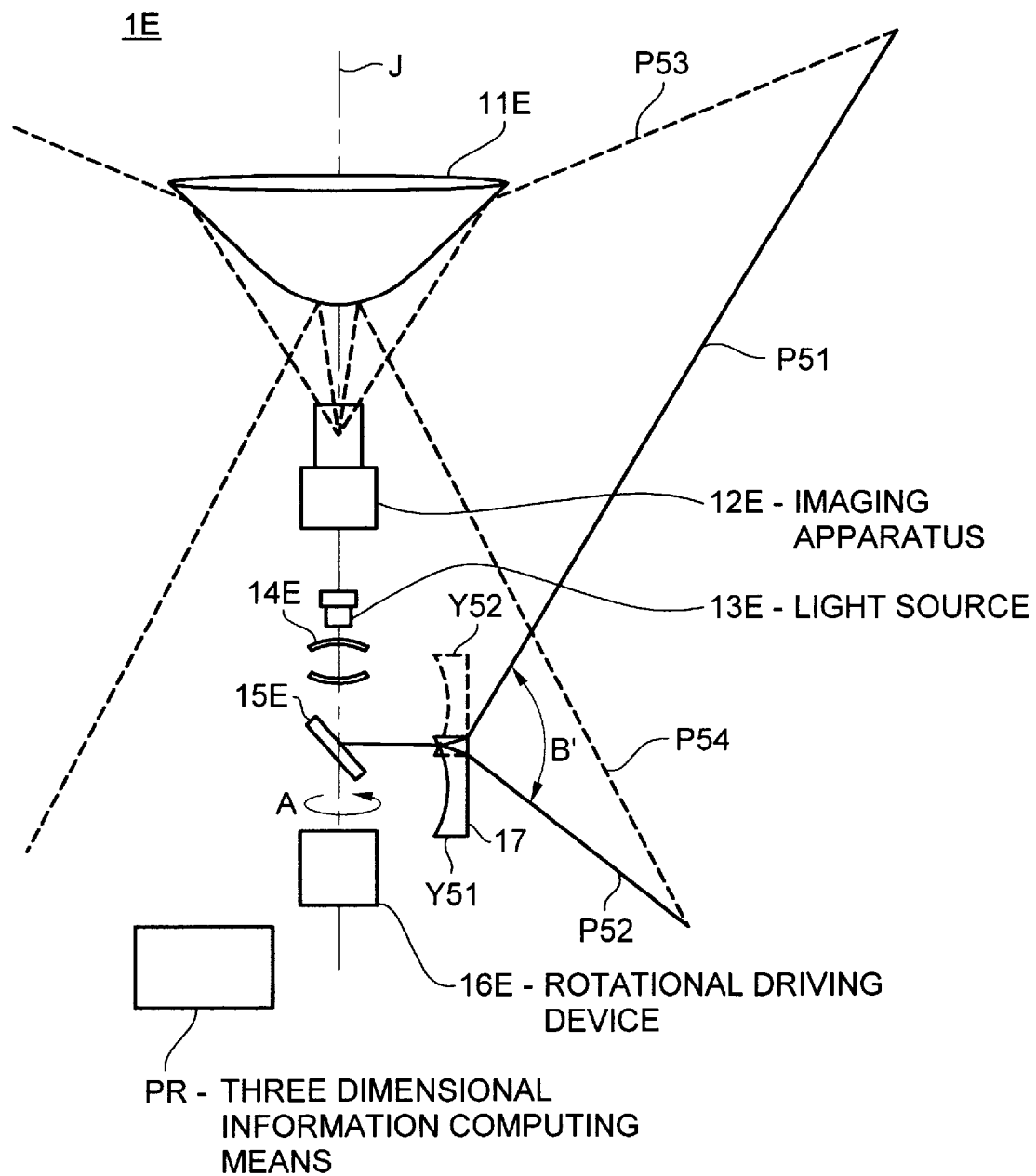
FIG. 9 is a diagram showing the configuration of a three dimensional information measurement apparatus according to a fifth embodiment.
Figure 10:
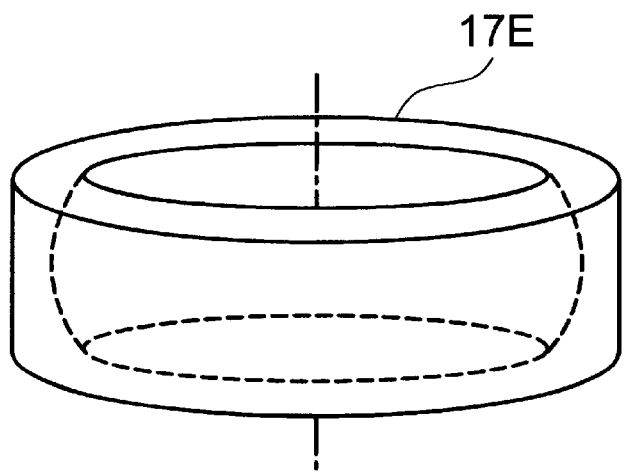
FIG. 10 is a diagram showing an external view of an annular lens used in the fifth embodiment.

FIG. 9 is a diagram showing the configuration of a three dimensional information measurement apparatus 1E according to a fifth embodiment, and FIG. 10 is a perspective view showing an external view of an alternative scanning lens 17 used in the three dimensional information measurement apparatus 1E.

As shown in FIG. 9, in the three dimensional information measurement apparatus 1E also, an imaging mirror 11E, similar in shape to the one used in the three dimensional information measurement apparatus 1A of the first embodiment, is provided. Below the imaging mirror 11E is disposed an imaging apparatus 12E whose light receiving axis is aligned with the axis J.

Downward of the imaging apparatus 12E and along the axis J are arranged a light source 13E, a scanning optical system 14E, a scanning mirror 15E, and a rotational driving device 16E, in this order from top to bottom.

The light source 13E emits reference light which is passed through the scanning optical system 14E to form a reference light beam having a suitable diameter. This reference light beam is reflected by the scanning mirror 15E and redirected into the scanning lens 17 for radiation. The scanning lens 17 is movable in vertical directions parallel to the axis J. As the scanning lens 17 moves, the incidence position of the reference light beam on the scanning lens 17 changes, thus changing the deflecting angle of the projected beam.

For example, if a concave lens is used as the scanning lens 17, as shown in FIG. 9, when the scanning lens is located at the position indicated by Y51, the reference light beam is projected in the direction indicated by solid line P51, and when the scanning lens is located at the position indicated by Y52, the reference light beam is projected in the direction indicated by solid line P52. That is, the reference light beam is radiated over the angular range indicated by arrow B' between the solid lines P51 and P52. If an object is located within this angular range, the object is scanned by the reference light beam, in the direction parallel to the axis J. This is the sub scan operation in the present embodiment. Reflected light from the object enters the imaging apparatus 12E after traveling along the paths indicated by dashed lines P53, P54, etc.

The rotational driving device 16E is constructed with a motor or with a motor, gear, etc., and drives the scanning mirror 15E and the scanning lens 17 or, in addition to them, either the light source 13E or the scanning optical system 14E or both, to rotate about the axis J as shown by arrow A. With this arrangement, the reference light beam to be projected through the scanning lens 17 is deflected to scan along the circumferential direction around the axis J, and is thus radiated in all directions around the axis J. As a result, any object located in any direction around the axis J is scanned by the reference light beam. This is the main scan operation in the present embodiment.

By combining the main scan and the sub scan, scanning is performed in all directions within the angular range indicated by arrow B', to measure objects located within that range. That is, for one cycle of the main scan (one revolution along the direction of arrow A), the radiation angle of the reference light beam is changed by an amount equal to the resolution of the sub scan direction by repositioning the scanning lens 17, the radiation angle thus being changed incrementally while the sub scan once traverses the range indicate by arrow B'. In this way, the reference light beam is radiated to scan objects located in all directions around the axis J within the range indicated by arrow B'.

In the above embodiment, both the scanning mirror 15E and the scanning lens 17 are rotated about the axis J to perform the main scan, but in an alternative configuration, the scanning lens 17 is replaced by an annular scanning lens 17E, as shown in FIG. 10, for example, whose cross section cut by a plane containing its center axis is concave. When the scanning lens 17E of such shape is placed with its center axis aligned with the axis J, the main scan can be accomplished by only rotating the scanning mirror 15E. In this case also, it is of course necessary to move the scanning lens 17E up and down to perform the sub scan. Here, the scanning lens 17E may instead be formed convex in cross section.

Description of Method for Three Dimensional Information Computation

Next, referring to FIGS. 11 to 17, a description will be given of how the three dimensional information is computed in the three dimensional information computing section PR.

Figure 11:
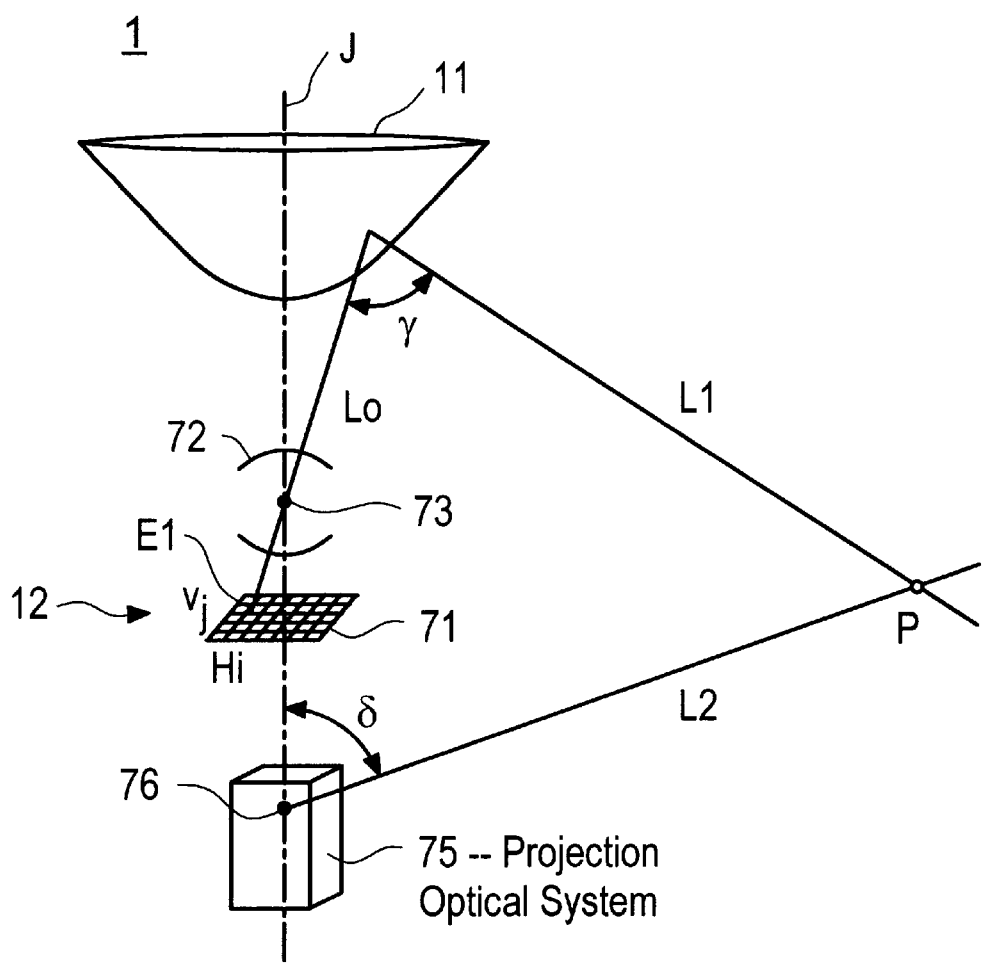
FIG. 11 is a diagram showing an optical relationship between the three dimensional information measurement apparatus and a point on the object to be measured.
Figure 12:
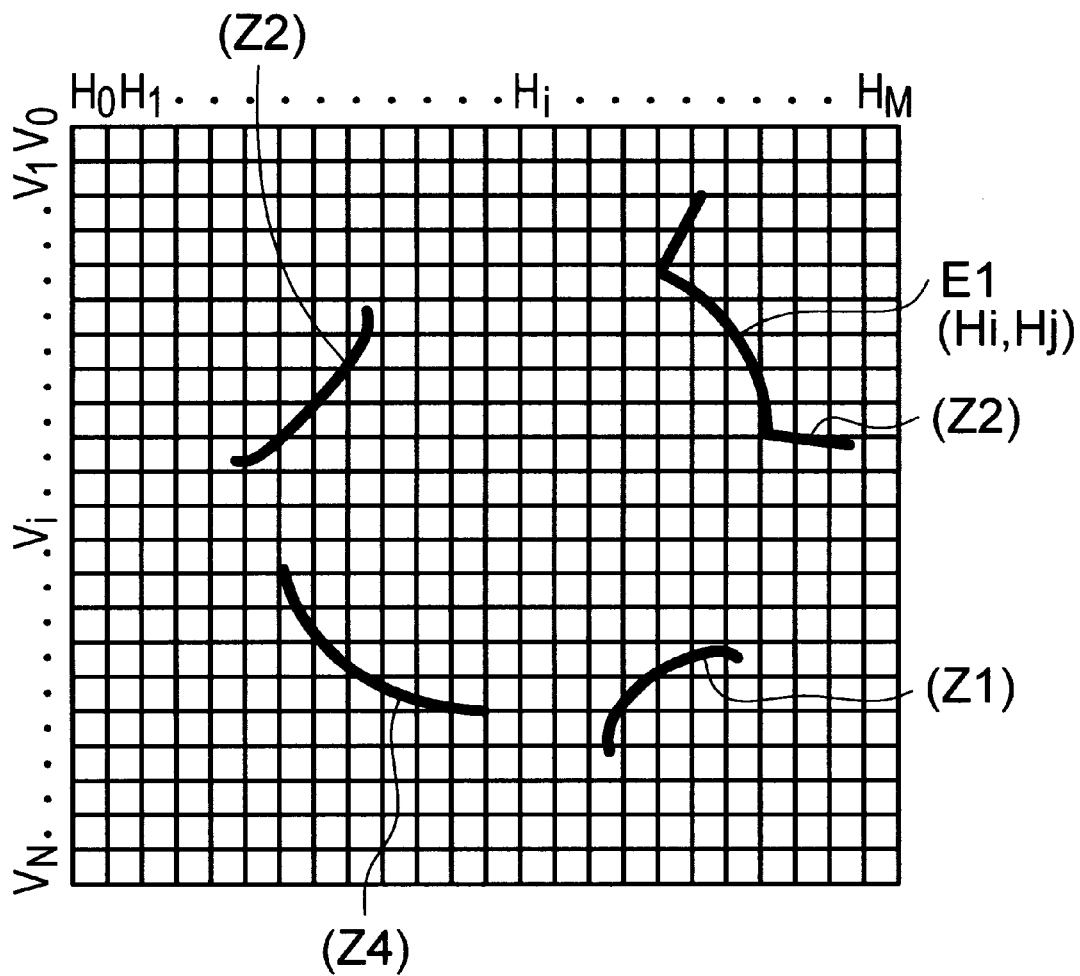
FIG. 12 is a diagram schematically showing the loci of reference light spots focused on an imaging device.
Figure 13:
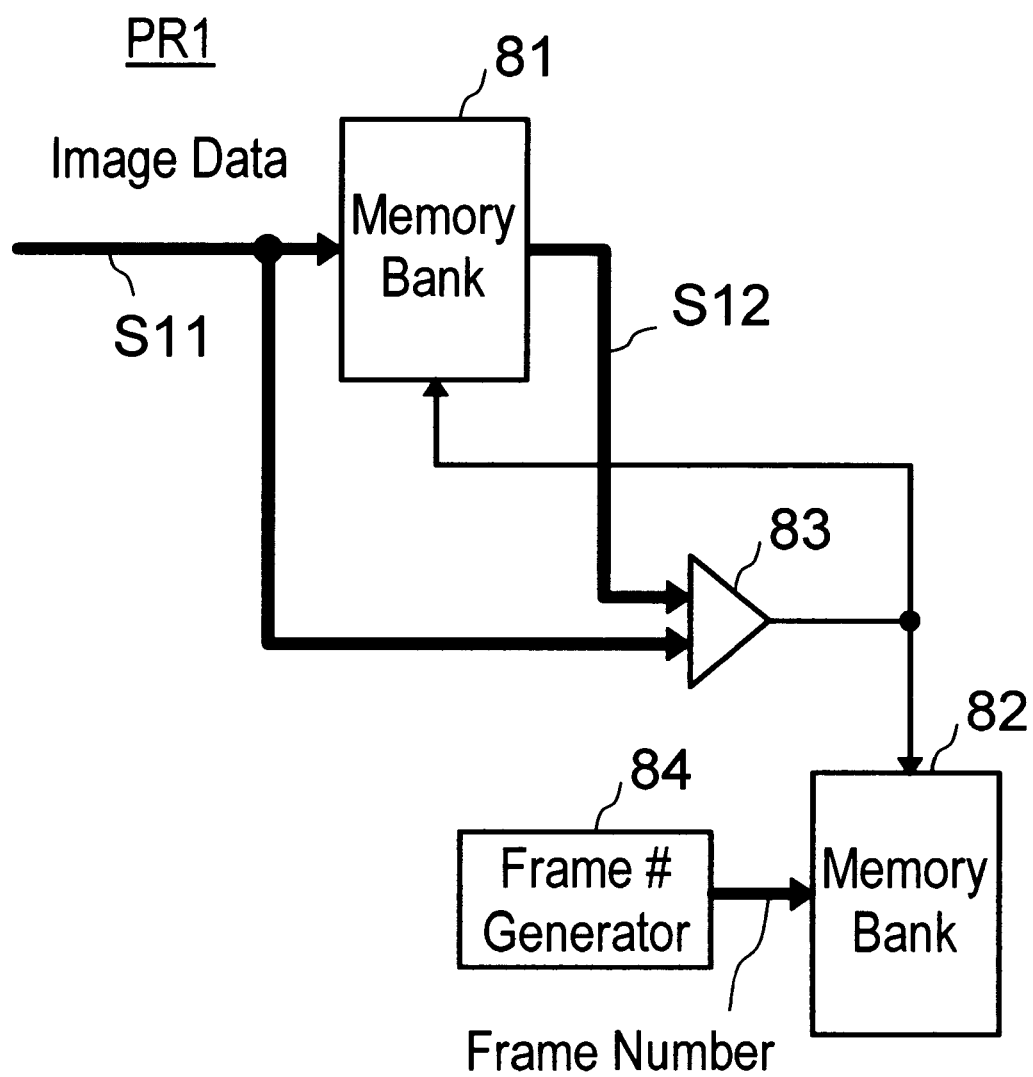
FIG. 13 is a block diagram showing an example of a processing circuit in the three dimensional information measurement apparatus.
Figure 14:
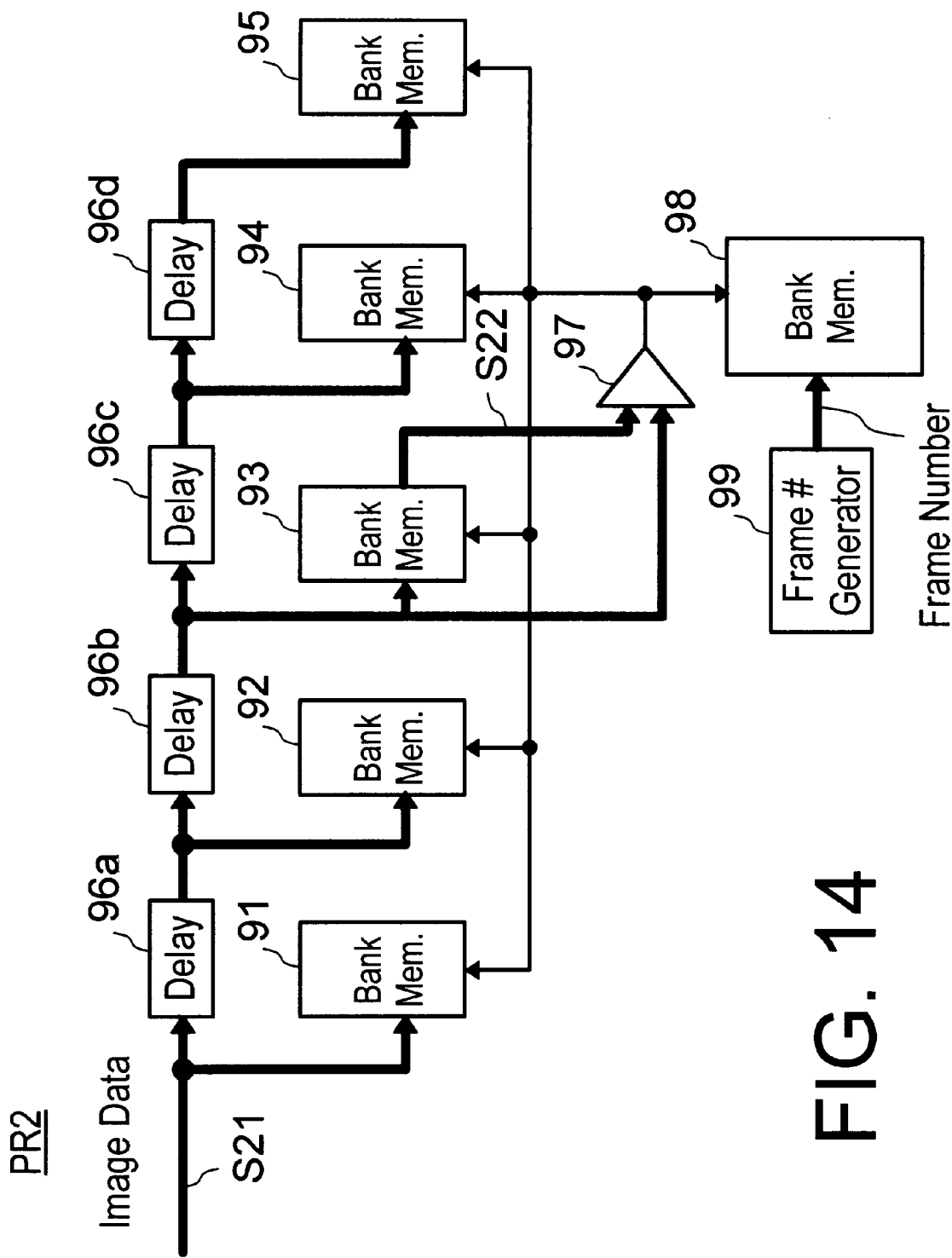
FIG. 14 is a block diagram showing another example of the processing circuit in the three dimensional information measurement apparatus.
Figure 15:
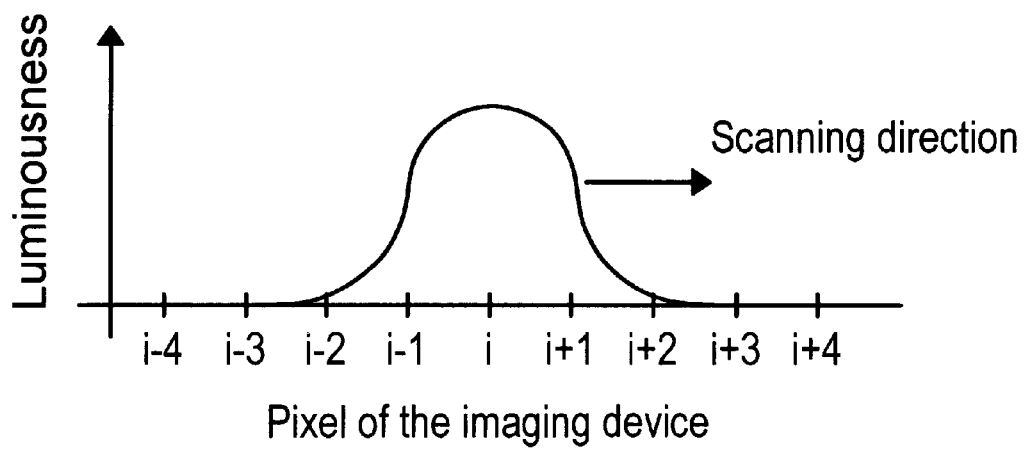
FIG. 15 is a diagram showing an example of the thickness and luminance of projected light on the imaging device.
Figure 16:
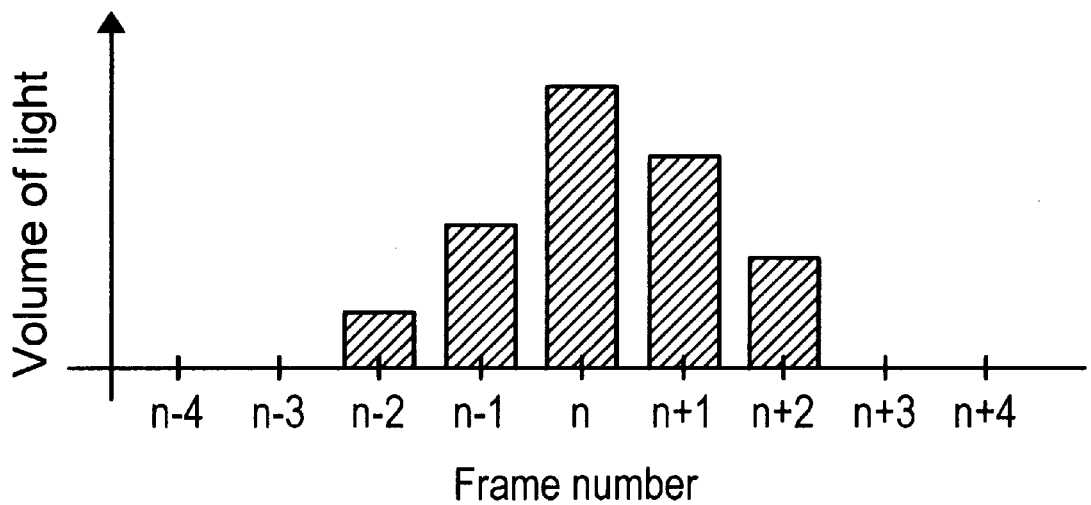
FIG. 16 is a diagram showing the changing amount of light for one pixel on the imaging device.
Figure 17:
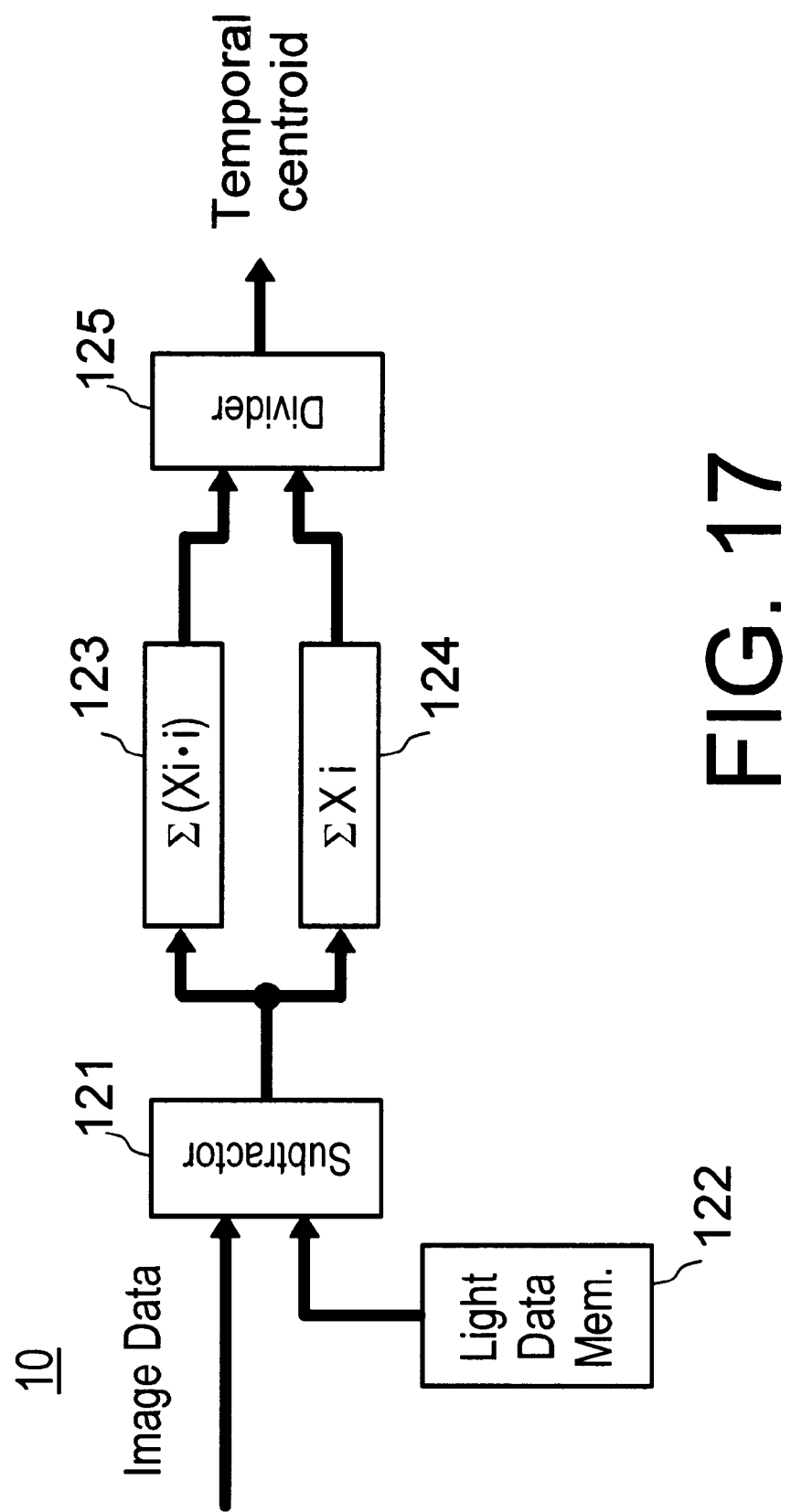
FIG. 17 is a block diagram showing the configuration of a processing circuit for computing the temporal centroid of image data.

FIG. 11 is a diagram showing an optical relationship between the three dimensional information measurement apparatus 1 and a point P on the object OB to be measured, FIG. 12 is a diagram schematically showing the loci Z of reference light spots observed by the imaging apparatus 12 and focused on the imaging device 71, FIG. 13 is a block diagram showing an example of the processing circuit in the three dimensional information measurement apparatus 1, FIG. 14 is a block diagram showing another example of the processing circuit in the three dimensional information measurement apparatus 1, FIG. 15 is a diagram showing an example of the thickness and luminance of the projected light on the imaging device 71, FIG. 16 is a diagram plotting the changing amount of light from frame to frame, of the projected light when attention is paid to one particular pixel on the imaging device 71, and FIG. 17 is a block diagram showing the configuration of a processing circuit 10 for computing the temporal centroid of image data.

The imaging apparatus 12 uses an imaging device such as a CCD for converting an image into an electrical signal. Many of the imaging devices currently commercialized are constructed with a large number of light sensitive elements arranged in a Cartesian coordinate system. Accordingly, as previously shown in FIG. 3, images of the loci Z of the reference light beam during one cycle of the main scan at a given sub scan timing, or of the annular reference light (these reference light beams may sometimes called the "projected light"), are focused on the imaging device 71 as schematically illustrated in FIG. 12.

To compute the three dimensional information based on the images formed on the imaging device 71, it is necessary to know the projection timing of the continuously scanning reference light that has contributed to image formation on each pixel of the imaging device 71.

Assuming here that the imaging device 71 is a CCD, attention is paid to one pixel E1 indicated by coordinates (Hi, Vj) on the imaging device 71. On the pixel E1 is focused an image of the point P lying on the straight line (light ray) L1 formed by reflecting the straight line (light ray) L0 joining the pixel E1 to the lens principal point 73 of the imaging apparatus 12 by the imaging mirror 11.

The angle γ that the straight line L0 makes with the straight line L1 is determined according to the incidence angle of the straight line L0 to the imaging mirror 11. The angle of the straight line L1 relative to the horizontal line is determined accordingly. The point P corresponding to the image on the pixel E1 lies somewhere on the straight line L1.

When attention is paid to the output (electrical signal) of the pixel E1 while capturing images of the projected light by the imaging apparatus 12, the output of the pixel E1 shows a peak value at the instant that the reference beam passes the point P corresponding to the pixel E1. Accordingly, if the projection angle δ of the pixel E1 shows the peak value, and a projection principal point 76 defining the space coordinates of the originating point of that projected light, can be determined, then a straight line L2 on which the point P is supposed to lie can be determined from the projection angle δ and the projection principal point 76.

The intersection of the straight lines L1 and L2 thus derived is the three dimensional position of the point P. By applying such a process to all the pixels of the imaging device 71, three dimensional information on the points corresponding to all the pixels can be computed.

The configuration of the projection optical system 75 differs from embodiment to embodiment; as a result, the position of the projection principal point 76 and the temporal change of the position also differ. However, in each particular configuration of the projection optical system 75, there is a one-to-one correspondence between the temporal change and the projection angle δ. Therefore, for the computation of the three dimensional information, it is sufficient if the projection angle δ can be detected, out of the projection angle δ and the position of the principal point 76.

In FIG. 13, thick arrows indicate primarily data flow, and thin arrows indicate primarily command flow. This also applies in FIG. 14. As shown in FIG. 13, the processing circuit PR1 consists of two memory banks 81 and 82, a comparator 83, and a frame number generator 84. The memory banks 81 and 82 each have a storage capacity equivalent to the data size of the image obtained by the imaging apparatus 12.

Analog image data output from the imaging device 71 is converted by a known analog processing circuit into digital image data, which is then input to the processing circuit PR1.

Of the image data of each pixel, the luminance value of the pixel is written into the memory bank 81. The image frame number at the time that the luminance shows a peak value for each pixel of the imaging device 71 is written into the other memory bank 82. The image frame number corresponds to the time that elapsed from the time that the above process for inputting the three dimensional information was started. That is, the image frame number corresponds to the projection angle δ of the projected light when scanning the object OB in the sub scan direction.

The luminance value S11 in the image data input to the processing circuit PR1 is compared by the comparator 83 with the luminance value S12 of the same pixel in the memory bank 81 where the largest luminance value of the past is stored for each pixel. If the input luminance value S11 is larger than the luminance value S12 stored in the memory bank 81, the luminance value at the address in the memory bank 81 corresponding to that pixel is updated with the luminance value S11, and also, the contents at the corresponding address in the memory bank 82 is updated with the frame number supplied from the frame number generator 84.

By repeating the above process the number of times equal to the total number of frames which is determined by the number of pixel rows on the imaging device 71 and other conditions, the luminance value at the time that the output of each pixel showed a peak value is stored in the memory bank 81, and the corresponding frame number is stored in the memory bank 82. Based on the frame number stored in the memory bank 82, the projection angle δ of the projected light at the time the luminance shows a peak value is obtained for each pixel.

According to the processing circuit PR1, the projection angle δ (or its corresponding physical quantity) of the projected light can be obtained using relatively simple circuitry. However, in the processing circuit PR1, the resolution of the projection angle δ cannot be made higher than the pixel pitch of the imaging device 71.

Referring now to FIG. 14, a processing circuit PR2 will be described wherein the circuit configuration of the processing circuit PR1 is extended so as to achieve higher resolution in obtaining the projection angle δ.

As shown in FIG. 14, the processing circuit PR2 consists of delay memories 96a, 96b, 96c, and 96d, bank memories 91, 92, 93, 94, 95, and 98, a comparator 97, and a frame number generator 99. Each of the memory banks 91 to 95 and 98 has a storage capacity equivalent to the data size of the image obtained by the imaging apparatus 12. Each of the delay memories 96a to 96d delays input image data by one frame.

The delay memories 96a to 96d are connected in series, and signals output from the delay memories 96a to 96d are latched into the memory banks 92 to 95, respectively. This makes it possible to simultaneously reference the image data of five successive frames.

The luminance value S21 in the image data input to the processing circuit PR2 is compared by the comparator 97, after being delayed by two frames, with the luminance value S22 of the same pixel in the memory bank 93 where the largest output value of the past is stored for that pixel. If the luminance value S21 in the image data delayed by two frames is larger than the luminance value of the same pixel stored in the memory bank 93, the luminance values input to the respective memory banks 91 to 95 at that time are written to update the luminance values stored at the corresponding addresses in the memory banks 91 to 95.

Further, the contents at the corresponding address in the memory bank 98 are updated with the frame number of the output data supplied from the frame number generator 99.

By repeating the above processing the number of times equal to the total number of frames which is determined by the number of pixel rows on the imaging device 71 and other conditions, the following contents are stored in the memory banks 91 to 95 and 98. That is, the luminance value at the time each pixel showed a peak value is stored in the memory bank 93, the luminance value of the same pixel due to the projected light one frame after the pixel showed the peak value is stored in the memory bank 92, and the luminance value of the same pixel due to the projected light two frames after the pixel showed the peak value is stored in the memory bank 91. On the other hand, the luminance value of the same pixel due to the projected light one frame before the pixel showed the peak value is stored in the memory bank 94, and the luminance value of the same pixel due to the projected light two frames before the pixel showed the peak value is stored in the memory bank 95. Their corresponding frame numbers are stored in the memory bank 98.

It is assumed here that the projected light has a thickness equivalent to five pixels when focused on the imaging device 71, and that its luminance distribution is a monotonic bell-shaped curve having one peak value at the center, like a Gaussian distribution, as shown for example in FIG. 15. In this case, when attention is paid to one particular pixel and the change in the amount of projected light is plotted frame by frame, then the graph shown in FIG. 16 is obtained.

That is, the amount of light incident on the particular pixel exhibits significant values for five frames, and the value changes from one frame to the next. Further, the value changes in a monotonically increasing and monotonically decreasing manner like a Gaussian distribution. Accordingly, after the series of processing, the data stored in the memory banks 91 to 95 are such that the amount of light increases in the order of the memory bank 95 and the memory bank 94, reaching a maximum in the memory bank 93, and decreases in the order of the memory bank 92 and the memory bank 91. By calculating the centroid based on the data stored in the five memory banks 91 to 95, the center point of the projected light, that is, the position of the peak value, can be obtained with resolution higher than the frame spacing or pixel pitch. An algorithm for such centroid computation is described in detail in Japanese Patent Unexamined Publication No. 7-299921 disclosed by applicant.

As described above, according to the processing circuit PR2, the projection angle δ of the projected light can be obtained with higher resolution than the pixel pitch of the imaging device 71 and, therefore, the three dimensional information can be measured with higher accuracy. In reality, however, some form of noise is often introduced in the image of the projected light because of the characteristics of the projection optical system 75 and the optical system of the imaging apparatus 12. This may result in the occurrence of a plurality of peak values in the luminance distribution, or in the distribution tending to become flat and blurring the position of the peak value, deviating widely from the ideal shape. In such cases, with the above method, the calculation result of the peak value position is strongly affected by the noise.

The effect of such noise can be reduced if the calculation is made based on the amount of light measured over a sufficiently longer period before and after the timing of the luminance peak value, not limiting the period before and after that to two frames. The method for accomplishing this will be described with reference to FIG. 17.

As shown in FIG. 17, the processing circuit 10 consists of a subtractor 121, a steady-state light data memory 122, a first arithmetic device 123, a second arithmetic device 124, and a divider 125.

Image data Xi output from the imaging apparatus 12 is input to the subtractor 121, where unwanted steady-state light components, other than the projected light, are removed, and the resulting data is supplied to the first and second arithmetic devices 123 and 124.

The first arithmetic device 123 finds the product $Xi \cdot i$, i.e., the product of the image data Xi and the timing or frame number i at which the image data Xi is output, for each pixel of the imaging device 71, and computes the sum $\Sigma Xi \cdot i$ over the entire frame. The second arithmetic device 124 computes $\Sigma Xi$, i.e., the sum of the image data Xi over the entire frame. Then, the divider 125 computes the temporal centroid, $\Sigma(Xi \cdot i)/\Sigma Xi$, of the image data Xi. The method of this computation is described in detail in Japanese Patent Unexamined Publication No. 8-308106 disclosed by applicant.

According to the three dimensional information measurement apparatuses 1A to 1E of the first to fourth embodiments, three dimensional information can be measured on objects located in a space extending a wide angular range. In particular, since the imaging mirrors 11A to 11E used as the imaging apparatus need not be moved, the mechanism used in the prior art for moving the mirror can be omitted, achieving a reduction in the size of the driving device. Furthermore, since the driven parts can be reduced both in size and in weight, stable driving at high speed can be achieved. Accordingly, three dimensional information on objects located around the axis J can be input at high speed and with high stability using a relatively simple configuration. Among others, in the second and third embodiments, this advantage is further enhanced since the radiating reference beam is used and there is no need to drive the scanning mirror 44 and mask 54 in the main scan direction.

In the above embodiments, the three dimensional information measurement apparatuses 1A to 1E are capable of inputting three dimensional information measured on objects located over a field of view of 360 degrees around the axis J. Accordingly, when inputting the three dimensional information, there is no need to move the apparatus itself, and the three dimensional information can be measured around the entire circumference, for example, in a simple one-shot operation or action.

In the above embodiments, the three dimensional information measurement apparatuses 1A to 1E are capable of inputting three dimensional information measured on objects located over a field of view of 360 degrees around the axis J, but it will be appreciated that the invention is also applicable when the field of view is limited, for example, to 180 degrees or 270 degrees. In that case, mirror portions outside the measurement range may be omitted from the imaging mirrors 11A to 11E, and also, unnecessary portions of the reference light beam or reference light in the main scanning range can be omitted.

In the above embodiments, the optical mechanism and the three dimensional information computing section PR or processing circuit PR1, PR2 may be assembled in the same housing or assembled respectively in separate housings. It is also possible to use a personal computer or the like as the whole or part of the three dimensional information computing section PR or processing circuit PR1, 2. Further, the structure, shape, and disposition of the three dimensional information measurement apparatuses 1A to 1E themselves or of each individual component thereof, and the circuit configuration of the processing circuit PR1, PR2 and its processing details, etc. can be modified or changed as necessary without departing from the spirit and scope of the present invention.

What is claimed is:

1. A three dimensional information measurement method for measuring three dimensional information of a target placed in a space surrounding a center axis of a non-rotating rotator type mirror by using said rotator type mirror in combination with an imaging apparatus disposed with its light receiving axis aligned with the center axis of said rotator type mirror, comprising:

scanning said target by projecting reference light; and obtaining the three dimensional information of said target, based on a physical quantity corresponding to a projection angle of said reference light and on a physical quantity corresponding to a position of a projected image obtained when said reference light reflected from said target is captured by said imaging apparatus via said rotator type mirror.

2. A three dimensional information measurement method according to claim 1, wherein said rotator type mirror has a convex reflection surface.

3. A three dimensional information measurement apparatus, comprising:

a non-rotating rotator type mirror;

an imaging apparatus disposed with its light receiving axis aligned with a center axis of said rotator type mirror, for measuring three dimensional information of a target placed in a space surrounding said center axis;

a reference light projector for projecting reference light in the form of a beam;

a first scanner for performing a main scan by deflecting said reference light in a direction of projection whereby said direction of projection changes in a circumferential direction centered about said center axis;

a second scanner for performing a sub scan by deflecting said reference light whereby said direction of projection changes in a direction parallel to said center axis; and a three dimensional information computing unit for obtaining the three dimensional information of said target, based on a physical quantity corresponding to a projection angle representing the direction of projection of said reference light in the sub scan, and on a physical quantity corresponding to a position of a projected image obtained by said imaging apparatus and representing said reference light reflected from said target via said rotator type mirror.

4. A three dimensional information measurement apparatus according to claim 3, wherein said rotator type mirror has a quadric surface-of-revolution.

5. A three dimensional information measurement apparatus according to claim 4, wherein said quadric surface-of-revolution is selected from a group of quadratic surfaces comprising a hyperboloid, an ellipsoid, and a paraboloid.

6. A three dimensional information measurement apparatus according to claim 3, wherein said imaging apparatus includes a video camera.

7. A three dimensional information measurement apparatus according to claim 3, wherein said reference light projector includes a light beam source and an optical system forming a beam spot.

8. A three dimensional information measurement apparatus according to claim 3, wherein said first scanner includes a scanning mirror and a rotational driving device.

9. A three dimensional information measurement apparatus according to claim 8, wherein said second scanner includes an angular controller for controlling an angle of said scanning mirror about an axis perpendicular to said center axis.

10. A three dimensional information measurement apparatus according to claim 8, wherein said second scanner includes a scanning lens and a driver for moving said scanning lens parallel to said center axis.

11. A three dimensional information measurement apparatus according to claim 10, wherein said scanning lens rotates about said center axis in accordance with said scanning mirror.

12. A three dimensional information measurement apparatus according to claim 10, wherein said scanning lens has an annular shape symmetric about said center axis.

13. A three dimensional information measurement apparatus according to claim 3, wherein said rotator type mirror has a convex reflection surface.

14. A three dimensional information measurement apparatus according to claim 3, wherein said imaging apparatus is kept stationary at a fixed position during said main scan.

15. A three dimensional information measurement apparatus according to claim 3, wherein said rotator type mirror has a reflecting surface with the shape of a line or curve rotated about said center axis.

16. A three dimensional information measurement apparatus, comprising
  a non-rotating rotator type mirror;
  an imaging apparatus disposed with its light receiving axis aligned with a center axis of said rotator type mirror, for measuring three dimensional information of a target placed in a space surrounding said center axis;
  a radiating reference light projector for projecting radiating reference light into a surrounding area;
  a scanner for performing a scan by deflecting said reference light in such a manner as to change a projection angle of said reference light; and
  a three dimensional information computing unit for obtaining the three dimensional information of said target, based on a physical quantity corresponding to said projection angle representing a direction of projection of said reference light in the scan, and on a physical quantity corresponding to a position of a projected image obtained by said imaging apparatus and representing said reference light reflected from said target.

17. A three dimensional information measurement apparatus according to claim 16, wherein said radiating reference light projector includes a light projection apparatus for forming an annular shaped reference light when viewed in a plane perpendicular to said center axis wherein said annular shaped reference light increases in diameter as its optical distance to said light projection apparatus increases.

18. A three dimensional information measurement apparatus according to claim 16, wherein said scanner includes a cylindrically shaped mask and a driver for changing the orientation of said cylindrically shaped mask with respect to said center axis.

19. A three dimensional information measurement apparatus according to claim 16, wherein said scanner includes a cylindrically shaped mask with an annular slit there around and a driver for moving said cylindrically shaped mask along said center axis.

20. A three dimensional information measurement apparatus according to claim 16, wherein said scanner includes a cylindrically shaped mask with a helical slit there around and a driver for rotating said cylindrically shaped mask about said center axis.

21. A three dimensional information measurement apparatus according to claim 16, wherein said rotator type mirror has a convex reflection surface.

22. A three dimensional information measurement apparatus, comprising
  a non-rotating rotator type mirror;
  an imaging apparatus disposed with its light receiving axis aligned with a center axis of said rotator type mirror, for measuring three dimensional information of a target placed in a space surrounding said center axis;
  a radiating reference light projector for projecting radiating reference light into a surrounding area;
  a scanner for performing a scan by deflecting said reference light in such a manner as to change a projection angle of said reference light, wherein said scanner includes another rotator type mirror and a driver for moving said other rotator type mirror along said center axis; and
  a three dimensional information computing unit for obtaining the three dimensional information of said target, based on a physical quantity corresponding to said projection angle representing a direction of projection of said reference light in the scan, and on a physical quantity corresponding to a position of a projected image obtained by said imaging apparatus and representing said reference light reflected from said target.

23. A three dimensional information measurement apparatus according to claim 22, wherein said rotator type mirror has a convex reflection surface.

24. A three dimensional information measurement apparatus, comprising:
  a non-rotating rotator type mirror;
  an imaging apparatus disposed with its light receiving axis aligned with a center axis of said rotator type mirror, for measuring three dimensional information of a target placed in a space surrounding said center axis;
  a reference light projector for projecting reference light in the form of a beam;
  a scanner for deflecting said reference light in a direction of projection whereby said direction of projection changes in a circumferential direction centered about said center axis and for deflecting said reference light whereby said direction of projection changes in a direction parallel to said center axis; and
  a three dimensional information computing unit for obtaining the three dimensional information of said target, based on a physical quantity corresponding to a projection angle representing the direction of projection of said reference light in a scan, and on a physical quantity corresponding to a position of a projected image obtained by said imaging apparatus and representing said reference light reflected from said target via said rotator type mirror.

25. A three dimensional information measurement apparatus according to claim 24, wherein said scanner comprises a galvanometer scanner.

26. A three dimensional information measurement apparatus according to claim 24, wherein said scanner includes another rotator type mirror and a driver for moving said other rotator type mirror along said center axis.

27. A three dimensional information measurement apparatus according to claim 24, wherein said rotator type mirror has a convex reflection surface.

* * * * *